July 18, 1939.  J. MUROS  2,166,605
SHAVING IMPLEMENT
Filed Feb. 14, 1938
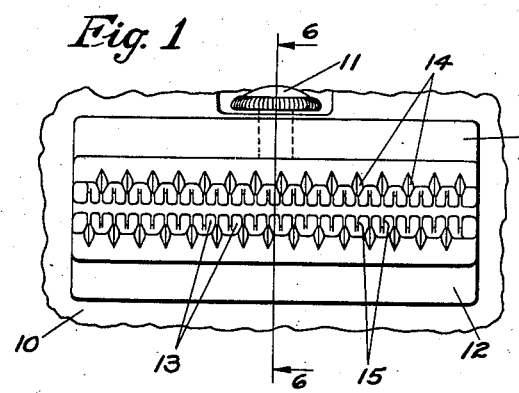
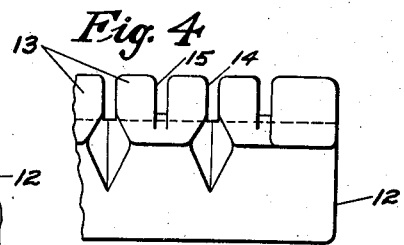
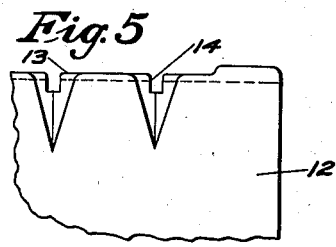
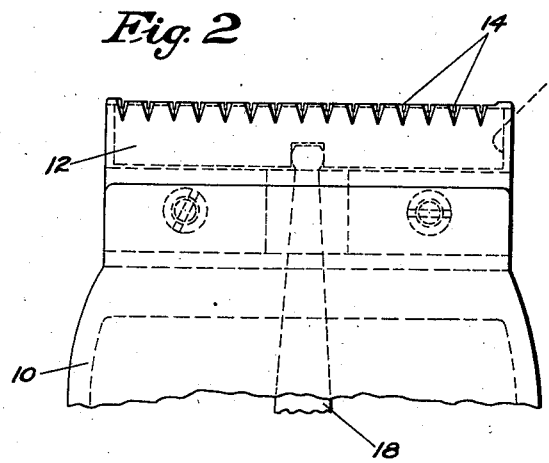
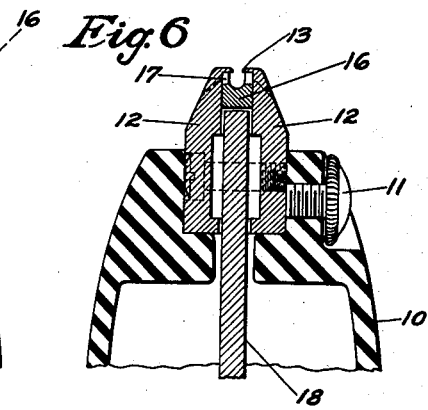
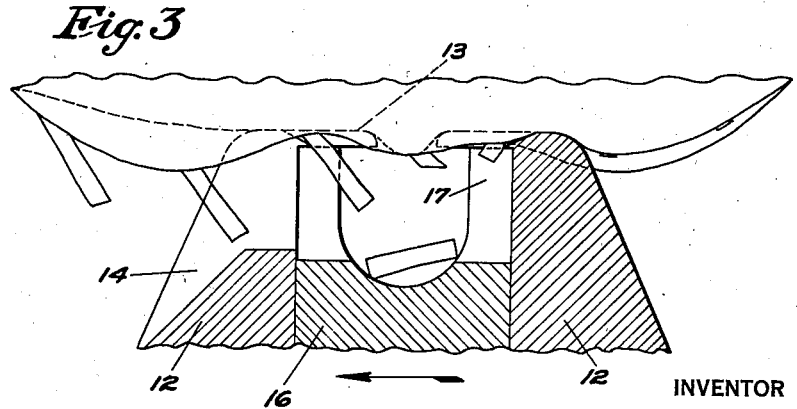
INVENTOR
Joseph Muros.
BY
ATTORNEY Patented July 18, 1939

2,166,605

UNITED STATES PATENT OFFICE 2,166,605

SHAVING IMPLEMENT

Joseph Muros, Cambridge, Mass., assignor to Gillette Safety Razor Company, Boston, Mass., a corporation of Delaware Application February 14, 1938, Serial No. 190,427

9 Claims. (Cl. 30—43)

This invention relates to implements employing relatively movable shearing members for shaving without the use of lather. It consists in an implement characterized by an outer or skin-engaging face of novel construction and design resulting in important advantages in the operation of the implement.

Implements of this type as heretofore constructed have been provided with transverse slots or passages uniformly spaced and open at their outer ends to admit hairs to the shaving zone. The spacing of these slots or passages has been limited by the strength of the material of the implement and by the practical dimensions of tools capable of forming them. As distinguished from a series of identical open-end slots, the present invention contemplates an alternating series of open-end slots and slots which are blind or closed at their outer ends and which thus provide shearing edges terminating within the contour of the skin-engaging face of the implement. There are numerous advantages which flow from this novel structure. In the first place, additional metal is provided in one of the shearing members of the implement and thus a stronger and more rugged implement is rendered available. In the second place, increased bearing surface in the implement is provided on the face of the user and this renders the implement peculiarly comfortable in use. In the third place, the closed-end slots act as traps to catch forwardly inclined hairs and bend them upright so that they assume a convenient shearing position without danger of passing beneath the outer shear teeth.

If preferred the open-end slots and the blind slots may be disposed in transversely staggered relation so that a forwardly inclined hair which passes through an open-end slot on one side of the implement is straightened into shaving position in passing the other side of the implement.

These and other features of the invention will be best understood and appreciated from the following description of a preferred embodiment thereof, selected for purposes of illustration and shown in the accompanying drawing, in which:

Fig. 1 is a view of the implement as seen from one end;

Fig. 2 is a corresponding view in elevation;

Fig. 3 is a fragmentary view in cross-section on a greatly enlarged scale;

Fig. 4 is a fragmentary end view on an enlarged scale;

Fig. 5 is a fragmentary view in elevation on an enlarged scale; and

Fig. 6 is a view in cross-section on the line 6—6 of Fig. 1.

The implement includes an elongated handle of "Bakelite" or other mouldable material and this may be shaped to serve also as a housing for the operating motor of the implement. The handle 10 is provided at its upper end with retaining flanges for the head of the implement and into one of these flanges is threaded a clamping screw 11.

The head of the implement includes a pair of similar outer stationary members 12, these being permanently secured together in spaced relation by spacing blocks and transverse screws. Each member 12, in the position illustrated, has a vertical inner wall and an inwardly overhanging flange at its upper end. The flanges are opposed and spaced from each other by a longitudinal opening extending from one end of the head to the other. The outer and upper walls of the members 12 are inclined inwardly in convergent relation.

Both the stationary members 12 are provided with two series of transverse slots. The slots 14 of the first series are open-ended and extend entirely through the flange of the member and into its outer portion in the form of a V-shaped channel. The bottom of each slot and channel slopes downwardly and outwardly and hair passages are thus formed through which hairs may freely pass into range of the shearing edges formed by the slots in the lower face of each overhanging flange. Each slot 15 of the second series is located midway between two open-end slots 14 and extends only partially through the flange of the outer member, terminating in a bevelled edge which slightly overhangs the inner wall of the member 12 in which it is cut. The alternate arrangement of open-end slots 14 and closed-end slots 15 provides a series of flat U-shaped lands which collectively make up the skin-engaging face of the implement. The edges of the slots 14 and 15, where these slots intersect the lower face of the stationary flange, provide shearing edges and these are uniformly spaced in the outer or stationary member although they vary in length as already explained. The slots 14 also form vertical shearing edges where they intersect the inner walls of the members 12.

The teeth formed by the slots 14 and 15 may be arranged in opposed relation in the flanges of the side members 12 or they may be arranged in staggered relation. As herein shown in the illustrated implement a blind slot 15 in one member 12 is arranged opposite to an open-end slot 14 in the other member with the result that a forwardly inclined hair passing through one of the slots 14 will enter the opposite blind slot 15 and be bent into an upright position by encountering the inner end of the slot, thus being positioned most advantageously for shearing.

The implement includes a reciprocatory cutter 16 comprising a bar of such width as to fill accurately the space between the vertical walls of the stationary members 12. The cutter 16 has two upstanding ribs disposed longitudinally and shaped to make contact with the under surface of the flanges of the members 12. The upstanding ribs are slotted to provide shearing teeth 17 which cooperate with the shearing edges of the slots 14 and 15 of the stationary members 12. In this way also are provided vertical shearing teeth cooperating with shearing edges formed in the inner vertical walls of the members 12 by the slots 14. The implement is thus provided with cooperating series of secondary shearing teeth operating in planes normal to the skin-engaging face of the implement. The cutter 16 provided in its lower face with a socket to receive the upper end of an operating lever 18, is arranged to be oscillated by the motor not shown.

In operation, the implement is pressed against the face of the user as suggested in Fig. 3 and moved transversely thereon. In this operation the skin bulges more or less into the open-end slots 14 and as the implement is moved transversely the hairs enter the passages 14 from outside the implement and are sheared once or more than once in passing the shaving zone as is suggested in Fig. 3. The hairs trapped between the opposed flanges of the members 12 may enter the inner ends of the slots 14 or of the blind slots 15. In the latter instance the hair is eventually bent into upright position by encountering the inner end or edge of the slot 15. Longer hairs may be sheared in the normal shearing zones by the action of the vertical edges of the teeth 17 in cooperation with the vertical edges of the slots 14.

It will be noted that the bevelled end edges of the short slots 15 are located somewhat within the inner walls of the members 12, as shown in Fig. 4, with the result that an increased bearing surface is provided for the upper ends of the cutter teeth to travel upon.

Having thus disclosed my invention and described a preferred embodiment thereof for illustrative purposes but not by way of limitation, I claim as new and desire to secure by Letters Patent:

1. A shaving implement comprising spaced stationary members having alternate open and closed-end slots arranged transversely in staggered relation, and a reciprocatory cutter having cooperating shearing teeth.

2. A shaving implement comprising stationary members having opposed overhanging flanges separated by an open space, said flanges having alternate open and closed-end slots arranged transversely in staggered relation, and a movable cutter having spaced upstanding ribs underlying the flanges of the stationary members and having shearing teeth formed therein.

3. A shaving implement comprising a stationary member having a flange traversed by a series of slots providing shearing edges, a blind slot entering said flange from its inner edge between each pair of traverse slots and providing additional shearing edges, and a movable cutter having cooperating shearing teeth.

4. A shaving implement comprising a stationary member having an inner wall and an overhanging flange, the member and flange being slotted to provide one series of shearing teeth and the flange only being slotted to provide a series of intermediate shearing teeth, and a movable cutter having cooperating shearing teeth.

5. A shaving implement comprising a stationary member having an overhanging flange at its edge which has a series of open-end slots passing through it and flaring outwardly, the overhanging portion of the flange being also slotted by closed-end slots in its overhanging edge between open-ended slots, and a movable cutter having upstanding shearing teeth.

6. A shaving implement comprising a stationary member having an overhanging flange provided at its overhanging edge with a series of transverse slots, certain of the slots having flared outlets and others terminating in hair-lifting edges located within the contour of the flanges, and a movable cutter.

7. A shaving implement comprising opposed face-engaging members having open-end and closed-end slots therein arranged transversely in staggered relation and presenting shearing teeth, and a cutter provided with cooperating shearing teeth.

8. A shaving implement comprising a pair of outer stationary members having vertical walls and overhanging flanges separated by an open space, the flange and body of each member being slotted to provide open-ended hair passages opening through the flange and wall and defining shearing edges, the flange being also slotted inwardly to a point substantially above its vertical wall to provide shearing edges terminated by a hair-lifting edge, and a movable cutter having shearing edges arranged to cooperate with those thus provided in the walls and flanges of the stationary members.

9. An implement of the class described, having a stationary member with an overhanging flange traversed by alternating long and short slots forming shearing teeth in the flange, and a reciprocatory cutter movable beneath said flange, the short slots terminating at a point leaving some of the flange material above the cutter.

JOSEPH MUROS.